Dec. 1, 1936.   E. C. NICHOLIDES   2,062,373
HEARING AID BONE VIBRATOR
Filed Aug. 25, 1933
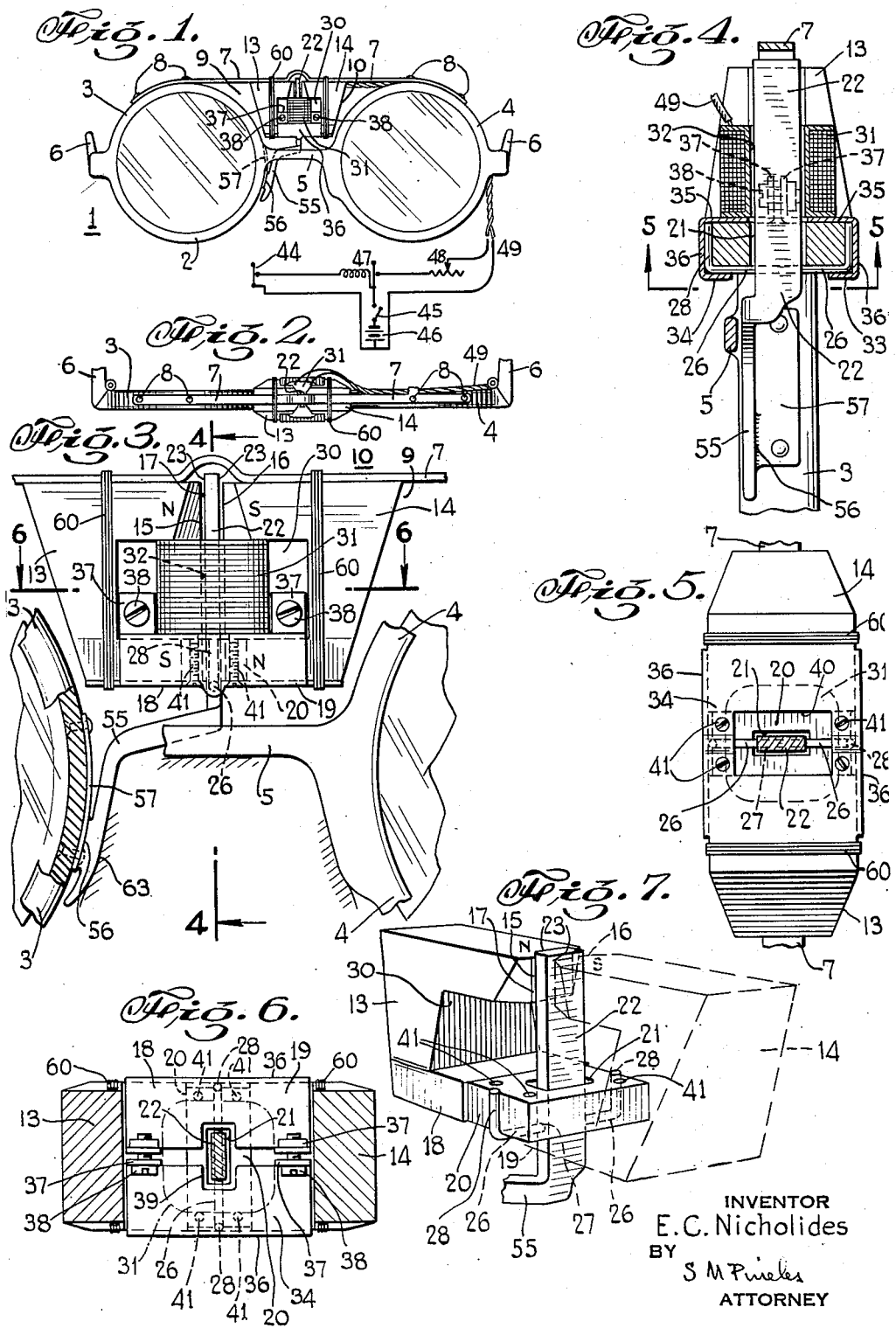
INVENTOR
E. C. Nicholides
BY
S M Pineles
ATTORNEY Patented Dec. 1, 1936

2,062,373

UNITED STATES PATENT OFFICE

2,062,373

HEARING AID BONE VIBRATOR

Emmanuel Christ Nicholides, New York, N. Y., assignor, by mesne assignments, to Sonotone Corporation, New York, N. Y., a corporation of New York Application August 25, 1933, Serial No. 686,698

1 Claim. (Cl. 179—107)

This invention relates to portable bone-conduction hearing-aids and among its objects is the provision of a small and light bone vibrator to be worn on the head of a person for converting electrical sound-frequency oscillations into mechanical vibrations imparted to sound conducting bone structure of the head for inducing in the auditory center of the person satisfactory hearing.

The features of the invention will be explained in connection with an exemplification thereof as illustrated in the attached drawing wherein Fig. 1 is an elevational view of a bone vibrator, with the associated elements of the hearing-aid shown diagrammatically;

Fig. 2 is a top view of the bone vibrator;

Fig. 3 is an enlarged elevational view of the vibrator mechanism and its mounting;

Fig. 4 is a vertical sectional view of the vibrator mechanism and its mounting along line 4—4 of Fig. 3;

Fig. 5 is a bottom view of the vibrator mechanism;

Fig. 6 is a top view partially in section of the vibrator mechanism along line 6—6 of Fig. 3; and Fig. 7 is a perspective view of the assembled magnetic structure of the vibrator mechanism.

In the exemplification illustrated in the drawing, the bone vibrator 1 is made as a part of a spectacle frame 2, shown in Fig. 1, comprising a pair of lens rims 3 and 4 joined by a bridge 5 made of pyroxylin or other suitable insulating material. The spectacle frame fits over the nose of the person and has temples 6 hinged on the outer sides of the frame rims and extending to the rear of the ears on both sides of the head to hold the frame firmly in place. A thin metal strip 7 of brass, for instance, has its ends riveted at 8 to the upper frame sides completing the frame, and leaving a free space 9 between the bridge 5 and the strip 7.

Within this space 9 above the bridge is mounted the electromagnetic bone vibrator mechanism 10, shown in detail in Figs. 3 to 7. It comprises a magnetic core structure formed of two U-shaped permanent magnet core members 13, 14 facing each other with the inner ends of their arms. The upper core arm ends terminate into pole faces 15, 16 spaced by a gap 17 and the lower core arm ends 18, 19 embrace a soft iron magnetic junction member 20. The pole faces 15, 16 of the two core members 13 and 14 are of opposite polarity, and face each other across the gap 17. The junction member 20 has a longitudinal rectangular perforation 21 aligned with the pole face gaps 17. A soft iron magnetic core member in the form of a flat bar 22 extends through the perforation 21, its upper end having on its opposite sides pole faces 23 facing the core-arm pole faces 15 and 16. The core bar 22 is provided with a torsion rod 26 which is rigidly secured in a transverse perforation 27 in the core bar and has outwardly projecting extensions underlying the underside of the junction member 20. The ends of the rod extensions are rigidly secured to the junction block by soldering or brazing to hold the core bar in a position in which it may vibrate around the axis of the torsion rod 26 against the restraining action of the torsional forces exercised by the rod. The torsion rod 26 may also be provided with upstanding members 28 united to the sides of the junction block by soldering or brazing, leaving the entire or only a part of the underlying rod extensions free to take up the torsional stresses strain between the core bar and junction block. The amount of torsional strain acting on the core bar may thus be adjusted.

Within the rectangular space 30 extending between the core arms of the magnetic core members 13 and 14 is mounted an inducing coil 31, the coil having a perforation 32 surrounding the core bar 17 and permitting its vibration between the poles 15 and 16 around the torsion rod 26.

A sheet metal clamp 35 holds the several elements of the core structure and the core bar together by clamping the junction member 20 and the lower core arms 18 between its bottom 34, top 35, and sides 36; the upper edges of the clamp having lugs 37 held clamped by screws 38. Perforations 39, 40 are provided on the top and bottom of the clamp to permit free movement of the core bar within the gap 17. Additional four screws 41 hold the clamp bottom 34 screwed to the four corners of the junction member 20, adding firmness to the structure.

The coil 31 is energized from a suitable sound-frequency oscillatory current source, such as a portable set used in connection with the prior art hearing-aids, indicated diagrammatically in Fig. 1. A transmitter microphone 44 is connected through a cutout switch 45 in series with a battery 46, a microphone amplifier 47, and a rheostat 48 to a cord 49 leading to the spectacle frame, the cord being held on the frame, and having its ends connected to the terminals of the inducing coil 31.

Sound waves acting on the diaphragm of the transmitter 44 induce corresponding currents in the amplifier 47 and the amplified sound-frequency currents are impressed through cord 49 on the coil 31. These sound-frequency currents in turn produce flux fluctuations in the gaps between the pole faces of the upper core members and exercise on the pole faces 23 of the core bar 17 corresponding vibratory forces tending to pull it to one and the other side against the restraining force of the torsion rod 26. The stiffness of the torsion rod connection between the core bar and the junction member is made sufficiently large to prevent the attractive forces induced in the gaps from freezing the diaphragm pole faces with one or the other of the core pole faces, the core bar being held on the junction member with sufficient rigidity to normally stay equally spaced from the core pole faces.

In accordance with my invention, the core bar is restrained in its movement and made to vibrate with a small amplitude. To this end, the vibrating bar is rigidly coupled to the supporting frame so as to be supported thereby and restrained in its vibration. The heavy core structure is supported in its vibrating position on the torsional rod 26 of the core bar and, upon energization, imparts through its support large vibratory forces to the bar causing the latter, by its coupling with the frame, to transfer the vibratory power to the bone structure.

This is shown in Figs. 1, 3 and 4 of the drawing. The core bar 22 is provided below its torsional rod support 26 with a rigid coupling member 55 which has on its outer side a coupling surface 56 firmly secured, as by soldering or brazing, to a reinforcing strip 57 which is firmly united and secured with the adjacent portion to the rim 3 of the spectacle frame by molding or riveting. With this arrangement, the flat core bar 22 projects vertically above the nose between the spectacle rims and carries on the torsion rod 26 the assembled core structure with the coil. Additional yielding support for the core structure is provided by windings of thread 60 tying the underside of the core structure against the upper supporting strip 7 of the frame, permitting limited movement of the core structure on its bar support.

For mounting the bone vibrator on the head and securing good coupling with the bone structure, the surface 63 of the inner side of the bar extension 55, the downward side of the bridge 5, and the adjoining surface portion of rim 4, are shaped to secure good engagement with the nasal bone structure and secure intimate contacts at which the impedance of the vibrator unit is approximately matched with the impedance of the bone structure.

The bone vibrator described above will operate as follows:

Upon energization of the coil 31 with sound-frequency currents, corresponding vibratory fluxes will be induced in the gaps between the pole faces of the core and the core bar and produce between them vibratory forces attracting the core bar alternately to one and the other core pole face. Because of the firm mounting and coupling of the core 22 with the spectacle frame and therethrough with the bone structure of the user, the core bar will be restrained against substantial vibratory movement and limited to a small amplitude. The relatively heavy magnetic structure pivoted on the torsion rod 26 carried by the bar will, however, be free to vibrate relatively to the bar under the forces acting on its pole faces, and its vibratory motion will impress by way of the torsion rod 26 vibratory forces on the coupling extension 55 of the bar 22 and therethrough on the frame of the spectacle, the latter transferring these vibrations upon the bone structure and producing hearing.

By making the torsion rod stiff enough to prevent freezing of the pole face gaps, and by impressing the vibrations on the bone structure through the close coupling of the bar 22 with the supporting frame, a good impedance match is obtained between the electromagnetic vibrator unit and the bone structure, causing efficient transfer of the mechanical vibratory energy produced by the vibration of the core structure to the head bones for inducing satisfactory hearing. In transmitting the vibrations, no forces tending to increase the freezing tendency are exercised on the gap pole faces, and accordingly no excessive stiffness is required in the vibrating connection between the main core structure and the core bar. It is thus possible to obtain enough vibratory energy for inducing satisfactory sound by bone conduction in a small and light vibrator structure that may be readily worn on the head of the user.

My invention is not limited to the specific features and details of construction described in connection with the exemplification, as many modifications and variations thereof will suggest themselves to those skilled in the art. It is accordingly requested that the appended claim be given a broad interpretation commensurate with the scope of the invention.

I claim:

In a hearing aid device, a bone-conduction receiver comprising a first magnetic core member of relatively small mass, a second magnetic core member of substantial mass resiliently joined to said first core member and constituting therewith a low reluctance magnetic flux path spaced by a gap, energizing windings interlinked with said flux path for producing a vibratory motion of audible frequency between said core members across said gap, and a spectacle frame carrying said core members having a contact surface engaging hearing-inducing bone structure, said first core member being joined to said frame for transmitting hearing-inducing vibrations from said first core member to said bone structure and limiting the amplitudes of the vibrations of said first core member, said frame having a junction to said second core member limiting its movement and preventing freezing of said core members across said gap.

EMMANUEL CHRIST NICHOLIDES.